United States Patent [19]

Daniels et al.

[11] 4,330,842
[45] May 18, 1982

[54] VALID MEMORY ADDRESS PIN ELIMINATION

[76] Inventors: R. Gary Daniels, 9005 Charnwood, Round Rock, Tex. 78664; Thomas H. Bennett, 4344 E. Desert Crest Dr., Scottsdale, Ariz. 85258; Michael F. Wiles, 1902 Flintrock St., Round Rock, Tex. 78664

[21] Appl. No.: 939,723

[22] Filed: Sep. 5, 1978

[51] Int. Cl.³ .................. G06F 3/00; G06F 13/00
[52] U.S. Cl. .................. 364/900; 365/191; 365/226
[58] Field of Search ............ 365/193, 59, 61, 226, 365/51, 191, 206, 227, 229; 364/200 MS File, 900 MS File

[56] References Cited

U.S. PATENT DOCUMENTS

| | | | |
|---|---|---|---|
| 4,087,855 | 5/1978 | Bennett et al. | 364/200 |
| 4,145,760 | 3/1979 | Ward et al. | 365/226 |
| 4,148,099 | 4/1979 | Lauffer | 365/191 |

*Primary Examiner*—James D. Thomas
*Assistant Examiner*—David Y. Eng

[57] ABSTRACT

A digital data processor on a single monolithic integrated circuit chip is provided which uses one less pin. The elimination of the pin is accomplished by using, internally to the processor, a valid memory address signal to gate information from the address but to an address output line. Whenever an address is not present on the address bus all logic "1's" are generated on the address output bus.

5 Claims, 1 Drawing Figure

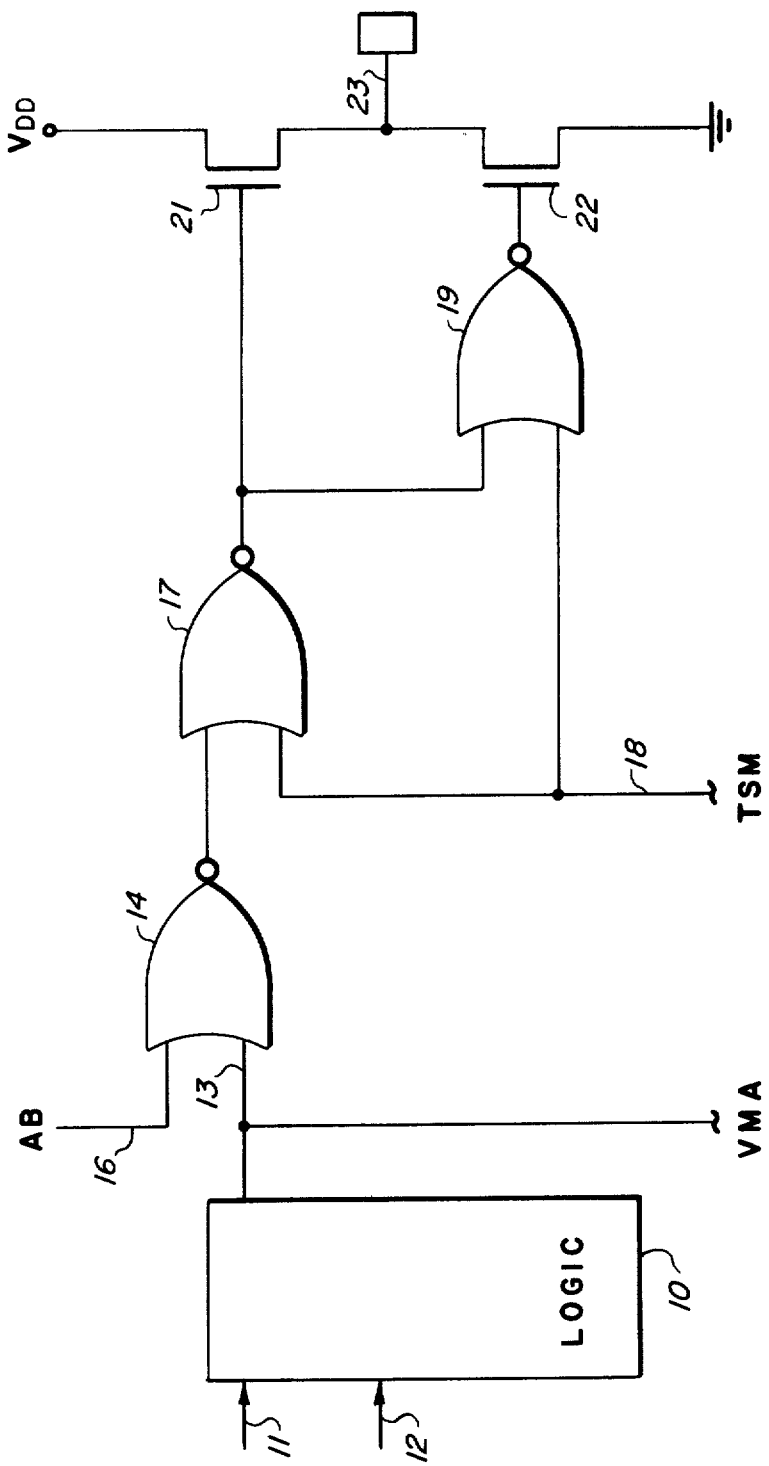

VALID MEMORY ADDRESS PIN ELIMINATION

BACKGROUND

This invention relates, in general, to monolithic integrated circuit chips containing data processors, and more particularly, to a data processor system not requiring a valid memory address enable pin.

Generally digital data processors made on a single monolithic integrated circuit chip interface with additional external memory and peripheral devices. When the processor is addressing these external devices it is necessary for the external device to know whether a read or a write operation is to be performed in addition to knowing the address. In the past, a read and a write strobe line connected to the external devices were used. Then when a read operation was to be performed a predetermined signal was transmitted on the read strobe line along with the proper address on the address output lines. For a write operation a predetermined signal was sent on the write strobe line while the proper address was sent on the address output lines.

Another scheme that is used, is to combine the read/-write signals onto one line and then to use a separate line as an address enable or a valid memory address line, and then the external device can decode the signal on the two lines and determine whether a read operation or a write operation is to be performed as well as knowing that the proper address is present at the address output lines. One such scheme is described in U.S. Pat. No. 4,087,855 to Thomas H. Bennett et al.

As digital data processors, which are made on a monolithic integrated circuit chip, become more complex and must interface with more external devices, it becomes highly desirable to reduce the number of interface pins or interface lines that are needed between the digital data processor and the external devices. A reduction in the number of interface pins results in less wiring that has to be done and also allows the digital data processor to be made in a smaller or at least in a standard package.

Accordingly, it is an object of the present invention to provide a monolithic integrated circuit chip having a microprocessor which does not require that a valid memory address enable signal be sent to external devices. This results in the elimination of an interface pin.

SUMMARY OF THE INVENTION

In carrying out the above and other objects of the present invention in one form there is provided a monolithic integrated circuit chip having a microprocessor wherein the microprocessor does not require an external valid memory address enable signal to be sent to external devices. Logic means are used to provide a valid memory address signal when the microprocessor desires to send an address to an external device. The valid memory address signal is used internally by the microprocessor to gate the address from the address buses onto address output lines.

BRIEF DESCRIPTION OF THE DRAWINGS

The single FIGURE illustrates a portion of a microprocessor which can be on a single monolithic integrated circuit chip employing the invention in one form thereof.

DETAILED DESCRIPTION OF THE PREFERRED EMBODIMENT

The single FIGURE illustrates how an address enable signal can be used within the chip itself thereby eliminating the requirements that the address enable signal go to external devices. This not only results in saving an extra pin from the microprocessor chip itself but also saves a pin from the external device which otherwise would be required to receive the address enable signal.

The address enable signal has been used in the past to prevent external devices from responding to addresses on the address output lines during microprocessor cycles in which the microprocessor is not performing a read or a write operation with the external device. The address output lines are coupled by buffers to an internal bus and the internal bus is also used to convey information between registers in the microprocessor, therefore, information on the internal bus continues to change even though an external device is not being addressed. The address enable signal is used to alert the external device that a valid address now appears on the output lines.

Logic circuitry 10 receives a timing input on line 11 and receives instruction inputs on line 12. Although line 12 is illustrated as being a single line it will be understood that more than one input instruction line may be needed in order for logic circuitry 10 to decode the instruction signals to provide a valid memory address (VMA) output on line 13. Logic circuitry 10 serves as a means for providing a valid memory address signal. The valid memory address signal appearing on line 13 goes to the input of a logic gate 14 which is illustrated as a NOR gate. The valid memory address signal also goes to other logic gates which are not illustrated but would be redundant circuitry similar to the circuitry illustrated. Logic gate 14 also receives an input on line 16 which comes from an address bus line. Each address bus line of the microprocessor would be coupled to a logic gate such as logic gate 14 and gated through the logic gate by the valid memory address signal. These additional address bus lines and logic gates are not illustrated since they would be redundant to the circuitry illustrated in the single FIGURE.

The output of logic gate 14 is connected to logic gate 17. The output of logic gate 17 is coupled to an input of logic gate 19 and to the gate electrode of a field effect transistor 21. Logic gates 17 and 19 are enabled by a tristate mode (TSM) signal on line 18. The output of logic gate 19 is coupled to the gate electrode of a field effect transistor 22. Field effect transistors 21 and 22 are connected in series between voltage $V_{DD}$ and reference, illustrated herein as ground. Transistors 21 and 22 serve as an output buffer. A junction formed by transistors 21 and 22 is connected to output line 23.

Logic circuitry 10 serves as a decoder to decode certain predetermined instructions and to synchronize the decoded instructions with an internal timing signal of the microprocessor to generate an address enable or valid memory address signal. The valid memory address signal is used to gate the address bus of the microprocessor to an output address line. When the microprocessor does not have an address to send to an external device, then the valid memory address on line 13 from logic circuitry 10 will be a logic level "1". A logic level "1" will force the output of NOR gate 14 to a logic level "0". The tristate mode signal on line 18 will also be a logic level "0" thereby providing a logic level "1" on the output of NOR gate 17. The "1" on the output of logic gate 17 forces the output of logic gate 19 to a logic level "0" and also enables field effect transistor 21. The logic level "0" from NOR gate 19 will inhibit transistor 22, however, since transistor 21 is enabled a logic level "1" will appear on address output line 23. By providing logic level "1's" on all the address output lines of the microprocessor the external device can perform a dummy read of the RESET vector address. In the 6800 family of microprocessors and in most other microprocessors, the RESET vector address is at the highest memory location which is designated by all "1's". It should be noted that the logic circuitry could be rearranged to provide any unique address other than an address of all "1's", if desired. Also, if tristate mode is not necessary for the output address line then the output from logic gate 14 could be connected directly to the gate electrode of transistor 22 thereby eliminating the logic gates 17 and 19. In such a case the gate electrode of transistor 21 would be connected to voltage terminal $V_{DD}$.

By now it should be appreciated that there has been provided a microprocessor system requiring one less output pin by eliminating the necessity of having a valid memory address signal going to devices external to the microprocessor. Such a processor is described in a copending patent application Ser. No. 939,741 entitled "Microprocessor Having Plural Internal Data Buses" by inventors Daniels, Wilder, Bennett, Wiles, and Musa which is assigned to the same assignee as the present application. This copending patent application is hereby incorporated herein by reference.

What is claimed is:

1. A monolithic integrated circuit comprising:
   a plurality of output address lines;
   an internal address bus;
   generating means for generating a valid memory address signal in response to an address on the internal address bus being a valid memory address;
   logic means coupled to the internal address bus and to the generating means, for receiving addresses via the internal address bus, for receiving the valid memory address signal, and for providing the address received via the internal address bus only if the valid memory address signal is simultaneously received; and
   address buffer means coupled to the logic means and to the output address lines, for receiving each address provided by the logic means, and for providing the received address via the output address lines.

2. The monolithic integrated circuit of claim 1 wherein the logic means provides a predetermined address if no valid memory address signal is received.

3. The monolithic integrated circuit of claim 2 wherein the logic means comprises a NOR gate.

4. The monolithic integrated circuit of claim 2 wherein the predetermined address is selected to provide logic "1's" on the output address lines.

5. A monolithic integrated circuit comprising:
   a plurality of output address lines;
   an internal address bus;
   generating means for generating a valid memory address signal in response to an address on the internal address bus being a valid memory address;
   logic means coupled to the internal address bus and to the generating means, for receiving addresses via the internal address bus, for receiving the valid memory address signal, and for providing the address received via the internal address bus if the valid memory address signal is simultaneously received but providing a predetermined address otherwise; and
   address buffer means coupled to the logic means and to the output address lines, for receiving each address provided by the logic means, and for providing the received address via the output address lines.

* * * * *